(12) United States Patent
Saccomanno

(10) Patent No.: US 7,015,983 B2
(45) Date of Patent: Mar. 21, 2006

(54) PROJECTION SYSTEM UTILIZING FIBER OPTIC ILLUMINATION

(75) Inventor: Robert J. Saccomanno, Montville, NJ (US)

(73) Assignee: Honeywell International Inc., Morristown, NJ (US)

( * ) Notice: Subject to any disclaimer, the term of this patent is extended or adjusted under 35 U.S.C. 154(b) by 630 days.

(21) Appl. No.: 10/184,359

(22) Filed: Jun. 26, 2002

(65) Prior Publication Data

US 2003/0025842 A1 Feb. 6, 2003

Related U.S. Application Data

(60) Provisional application No. 60/300,999, filed on Jun. 26, 2001.

(51) Int. Cl.
H04N 5/66 (2006.01)
H04N 5/74 (2006.01)

(52) U.S. Cl. .................. 348/758; 348/383; 385/36; 385/116

(58) Field of Classification Search ........... 348/744, 348/745, 758, 750, 383, 804; 359/831, 298, 359/391.1, 629; 353/30, 31, 33, 52, 57, 81, 353/84; 372/24; 385/4, 36, 116, 147
See application file for complete search history.

(56) References Cited

U.S. PATENT DOCUMENTS

| 5,485,225 | A | | 1/1996 | Deter et al. |
| 5,555,035 | A | | 9/1996 | Mead et al. |
| 6,078,704 | A | * | 6/2000 | Bischel et al. .................. 385/4 |
| 6,154,259 | A | * | 11/2000 | Hargis et al. ................ 348/756 |
| 6,870,523 | B1 | * | 3/2005 | Ben-David et al. ........... 345/84 |

OTHER PUBLICATIONS

International Search Report PCT/US02/20883; Oct. 18, 2002.

* cited by examiner

Primary Examiner—Victor R. Kostak
(74) Attorney, Agent, or Firm—Kurt Luther; James W. Falk

(57) ABSTRACT

An optical illumination, communication, or beam splitting system includes close-packed non-imaging morphing optical elements, beam splitting prisms, output elements, including non-imaging concentrating elements and optical detectors, and a beam dump for receiving energy from the beams not directed to the output elements, in various combinations. The sources of electromagnetic energy may comprise semiconductors emitting at different bands of wavelengths, wherein each band comprises a different color.

27 Claims, 13 Drawing Sheets

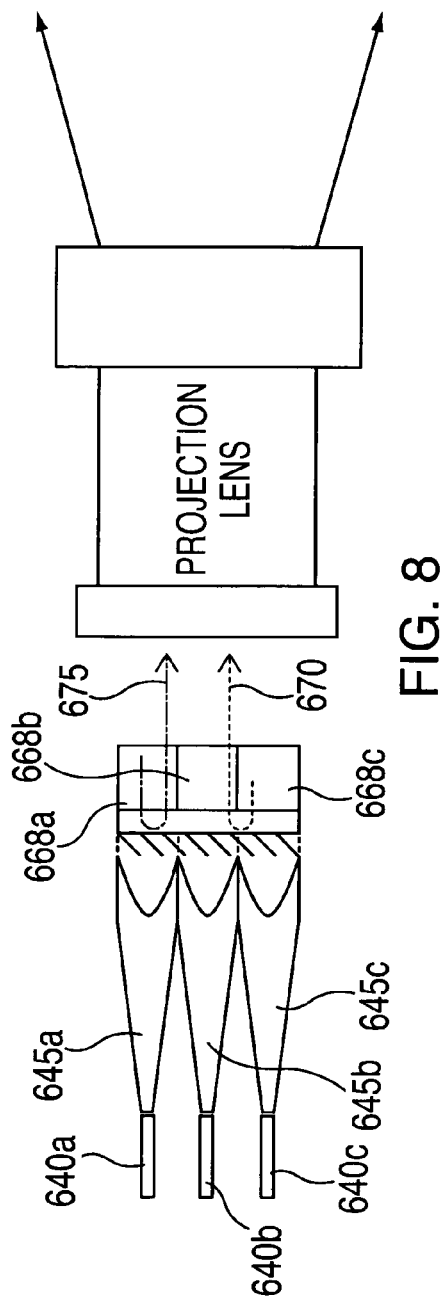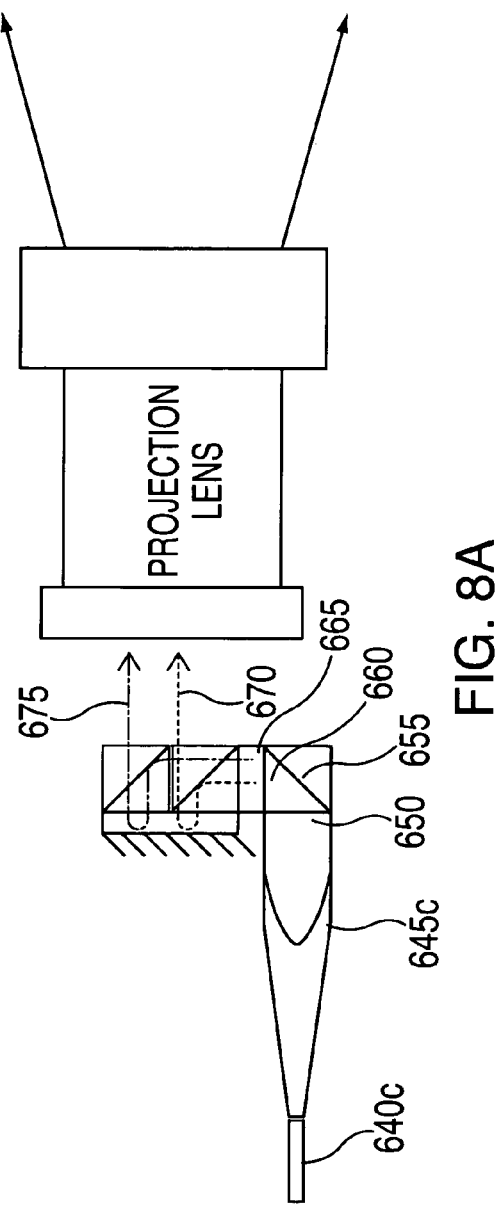
FIG. 8
FIG. 8A

SECTION A-A

SECTION A-A

PROJECTION SYSTEM UTILIZING FIBER OPTIC ILLUMINATION

This application claims the benefit of Provisional Application No. 60/300,999, filed Jun. 26, 2001.

BACKGROUND OF THE INVENTION

1. Technical Field

This invention is directed to a method and apparatus for illuminating electro-optical devices, a more specifically to projection system that uses optical fibers to distribute light.

2. Background Art

By far the most popular large-screen device is the projection display. Historically the source of the image was a cathode ray tube, and recently there has been great strides made with microdisplay imagers, both transmissive and reflective. Recently, JVC introduced a state-of-the-art liquid crystal on silicon (LCOS) imager, 1.3" diagonal device with 1920×1080 pixels. For resolutions higher than this, a tiled system would be employed. For example, Olympus Optical Co. has developed a tiled projection system using nine projectors, each 600×800 in a 3×3 matrix to create a 100" diagonal display with 2400×1800 pixels, with a price tag of $200,000 each. Alternately, Clarity Visual Systems promotes modular, stackable, projection elements, although not seamless.

Plasma displays have made some inroads in the high definition television (HDTV) market, with the largest displays at 50" in diagonal—the PlasmaSync 50MP1 from NEC with a resolution of 1,365×768 and weighing 101 pounds, and the Pioneer PDP-502MX, with a resolution of 1280×768, weighing in at 88 pounds—each retailing for more than $10,000. State of the art liquid crystal displays (LCDS) from Samsung and others are approaching 30-inch diagonals, with resolutions far surpassing that of plasma displays. For direct view sizes (and resolutions) higher than this, a tiled system would be employed. For example, Rainbow Displays has developed a tiling approach using a collimated backlight, custom LCDs with narrow borders, and a single projection screen placed across all devices.

A unitary projector or direct-view display cannot meet size and resolution requirements. Therefore, the option exists for a tiled-solution. All tiled systems must resolve perceived differences between tiled elements, e.g., luminance and chrominance uniformity for all gray shades over all viewing angles. To effect seamless operation, any perceived border between tiles must be eliminated, thereby adding additional complexity, especially when the pixel pitch at the viewing surface is less than a few millimeters.

Both projection- and direct-view tiling systems have the following cost disadvantages when compared with a unitary display.
1. The need for additional components, such as optical masks and feedback systems, that need to be inserted to hide the seams.
2. Niche-market status, leading to high recurring cost since the investment for lower cost solutions does not have adequate payback time.
3. Labor hours to accurately align tiles and calibrate the system during assembly.

Both projection- and direct-view tiling systems have the following performance disadvantages when compared with a unitary display.
1. Non-uniformities between tiled elements induced by minor differences between components in one or more of the tiles. For example, display device electro/optical characteristics, lamp aging characteristics, etc.
2. Loss of dynamic range by using gray shades to compensate for non-uniformities between tiled elements.

Projection-based tiled systems have the following cost disadvantages when compared with systems that employ a unitary projector.
1. Concentrated heat load in the volume around the projector array, necessitating special room-cooling considerations
2. Concentrated fan-noise in the volume around the projector array, necessitating special sound-dampening considerations
3. Maintenance costs involved in replacing lamps suspended near the ceiling, especially for the projectors in the middle of the array that may be hard to access
4. Need for a feedback control system to ensure alignment between tiled elements
5. Higher ambient temperatures for any projector located above another projector, potentially requiring temperature stabilization of the imaging elements to ensure uniform contrast and response time between tiled elements Projection-based tiled systems have the following performance disadvantage when compared with systems that employ a unitary projector.
1. Differences in thermal expansion between tiled elements as a result of temperature gradients that differ between one or more units, thereby causing misalignment between tiles over time unless periodic re-calibration is employed Direct view tiled systems have the following cost disadvantage when compared with systems that employ a unitary projector.
1. Special LCDs must be fabricated that employ unusually narrow dead-zones around periphery of the active display area Direct view tiled systems have the following performance disadvantages when compared with systems that employ a unitary projector.
1. Resolution limitations for seamless systems; practical limits of a mechanical seam appear to be on the order of 1 mm.
2. Differences in thermal expansion between tiled elements as a result of temperature gradients that differ between one or more units, thereby causing stress, which could lead to either structural fatigue (mechanical failure) or stress-induced birefringence (optical non-uniformities)
3. Inherent mechanical limits for a very large area glass structure, thereby reducing the practicality of arranging such systems.

One way to achieve very large area displays with very high resolutions is through tiling. However, the cost/performance trades of such systems, even when combined with prior inventions in the art, will continue to result in niche market status. There is a known demand for high-definition, seamless, large screen displays for such applications as advertising, theaters, and media-centers for the government, corporations, and the television broadcast industry. Specifically, there is a need for tiling approaches that achieve the full performance characteristics of a unitary device at low cost.

SUMMARY OF THE INVENTION

My invention collects high-intensity white light from a common light source, separates this high-intensity white light into primary color light components, and couples these components to multiple tiled elements via optical conduits. Note that the terms "optical conduit" and "fiber optic", as referenced below, are used interchangeably.

In one embodiment, a projection-based tiled display system, a single frame-sequential imager is used for each projection element, with centrally orchestrated electronic color switching, thereby eliminating the need to associate color separation and recombination optics with each imager, maintaining color balance between projectors, and greatly simplifying the construction within each projector. Plastic optical fibers (POFs) are employed to minimize cost and unique non-imaging optics are used to eliminate packing fraction losses. Such POFs are generally referred to as solid core and large core. Small core POFs are available from Mitsubishi, under the ESKA™ brand, with fibers up to ~3 mm core diameter. Large core POF, up to ~18 mm core diameter, are manufactured by Lumenyte under the Sta-Flex® brand, as well as OptiCore™ by Fiberstars, and Light Fiber from Sumitomo 3M. It is anticipated that technology being promoted for communications grade POFs will be incorporated into the illumination grade POFs as fiber illumination becomes more popular. Communications grade fibers have advanced POF technology, due the need for low losses over very long distances (1 kilometer or greater). For example, while Mitsubishi's ESKA illumination-grade CK product has an attenuation of 0.2 db/m, their communications grade CK fibers has an attenuation of 0.14 db/m. Asahi Glass markets Lucina™, a Graded Index —CYTOP® Optical Fiber (GI-COF). Lucina™ is made of a transparent fluoropolymer, CYTOP®. Although marketed for infrared wavelengths, the graded-index approach holds some promise for illumination fibers. In fact, communication fibers can be employed today for illumination applications, although at added expense due to the added per-foot cost of communications-grade fibers relative to illumination-grade fibers, and the need for more fibers because of their relatively smaller core diameters and lower numerical apertures.

Note that POFs represent one class of optical conduit. For example, hollow light tubes up to 6 inches in diameter and greater are manufactured by TIR Systems under the trademark Light Pipe™, utilizing prism light guide technology, and 3M has begun to market its multilayer polymeric radiant mirror film as a potential solution for hollow light tubes. Glass fiber bundles under the OPRA brand are being manufactured by Asahi Glass, as well as custom bundles manufactured by Schott-Fostec LLC. Liquid core light guides are also available, for example from Translight LLC. All of these conduits can be adapted for use in my invention; however, current market conditions favor illumination-grade POF in terms of cost/performance.

The present invention has the following advantages over the prior art.

1. Single lamp to minimize any color non-uniformities between tiles. Additional lamps can be added for increased luminance and/or fail-operational capabilities
2. Minimal cost for fibers by employing large core polymer-based technology
3. No packing fraction losses associated with optical fibers
4. No heat in the projectors by locating the light source remotely, reducing or eliminating the need for thermally stabilizing the imagers
5. No noise near the projectors by locating the light source remotely
6. No color filters associated with the imagers, again minimizing any color non-uniformities
7. Single imager projectors are less costly than three-imager projectors
8. No reductions in gray shades are necessary to match tiles
9. Low maintenance cost facilitated by centralized lamp placement that would be conveniently located for servicing
10. Other tiled architectures will be described, as will applications related to fiber optic communication systems.

BRIEF DESCRIPTION OF THE DRAWINGS

Figure 1:
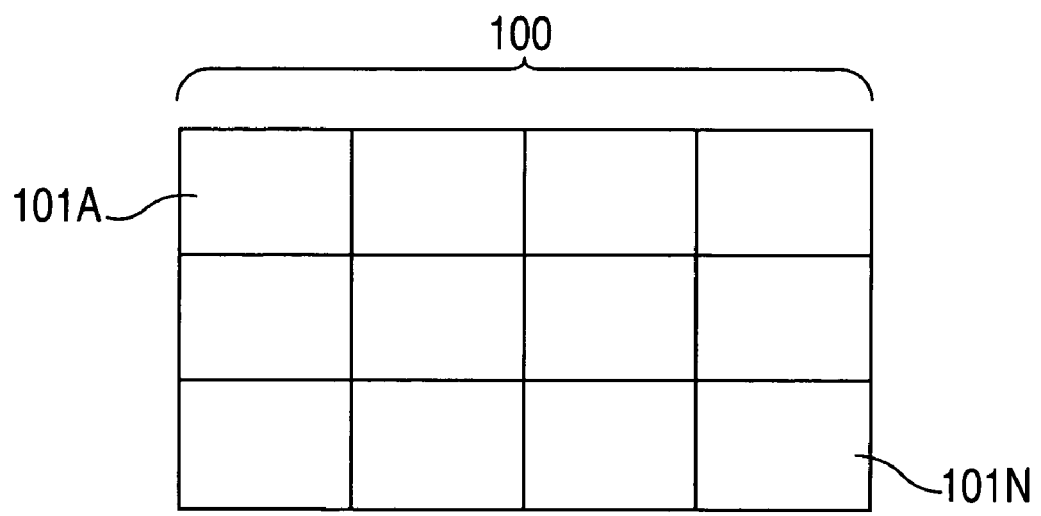

Brief Description of the Several Views of the Drawing

FIG. 1 shows a projection display image that is further broken down into twelve individual display tiles.

Figure 2:
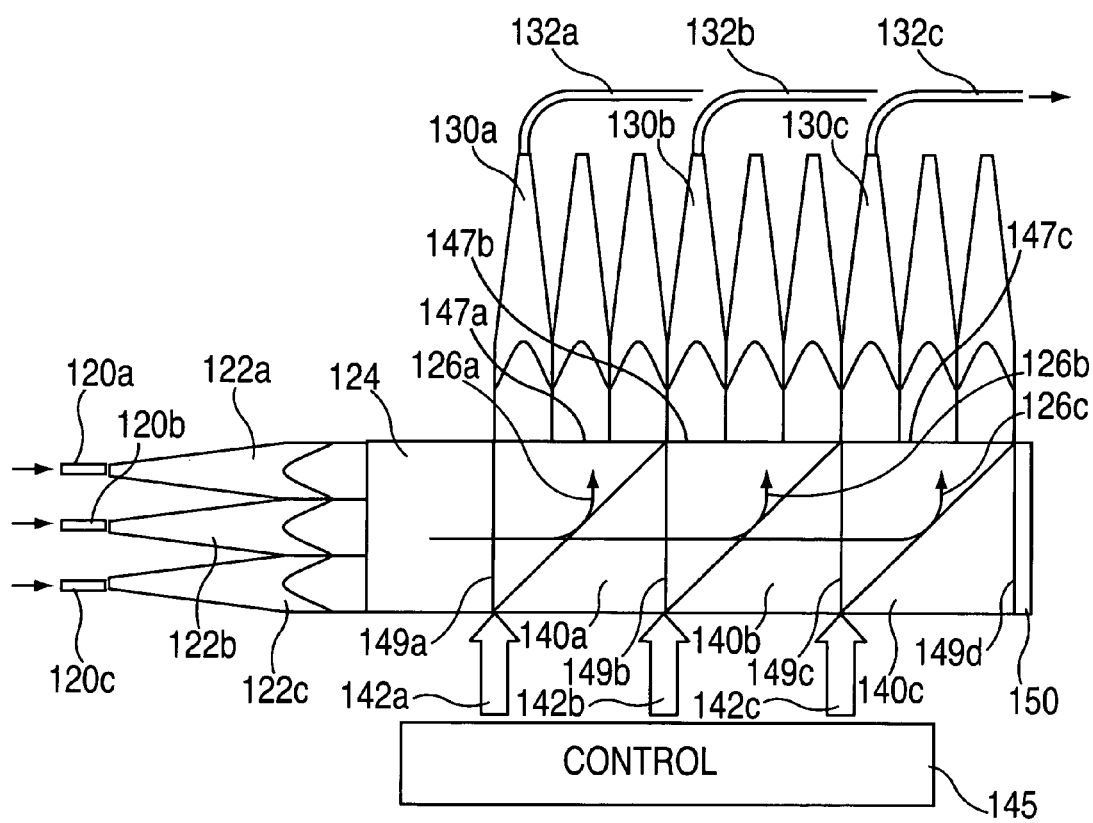
Figure 3:
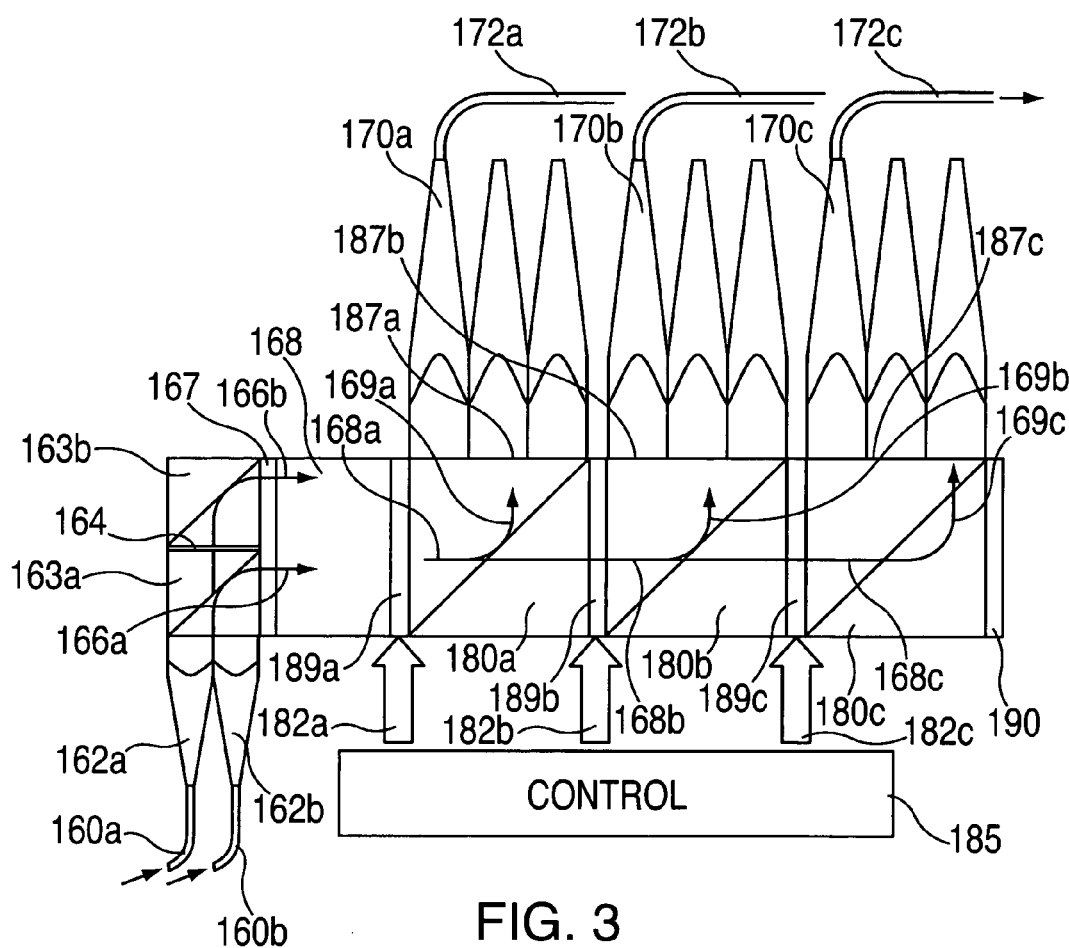
Figure 4:
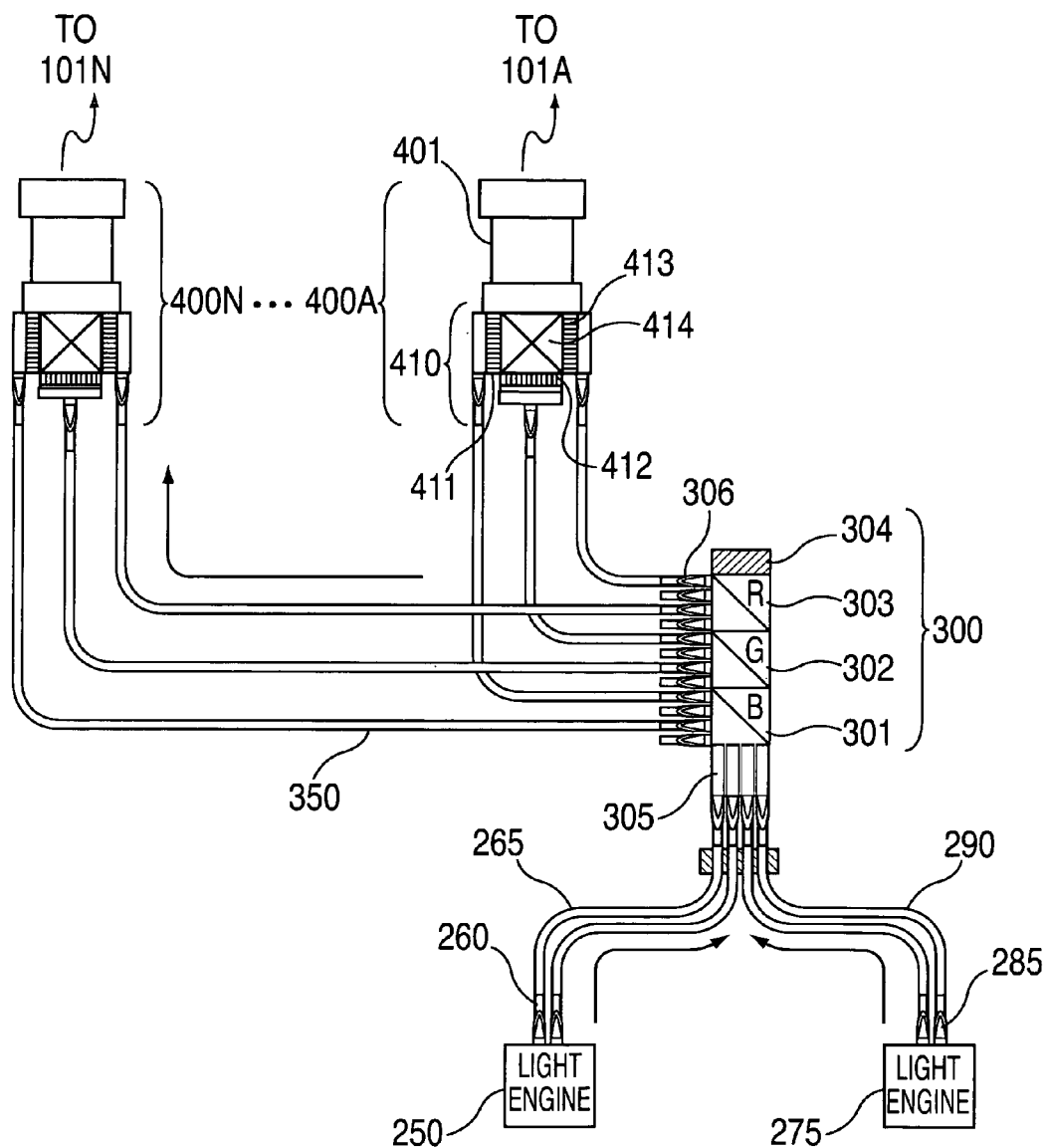

FIG. 2 shows one illustrative embodiment of a fiber-based color separation device FIG. 3 shows another illustrative embodiment of a fiber-based color separation device FIG. 4 illustrates a tiled projection display system using transmissive imaging devices as described in my application Ser. No. 09/860,731, filed May 18, 2001. Three such devices are used per display tile, with each device assigned to a primary color selected from the group of red, green, and blue.

Figure 5:
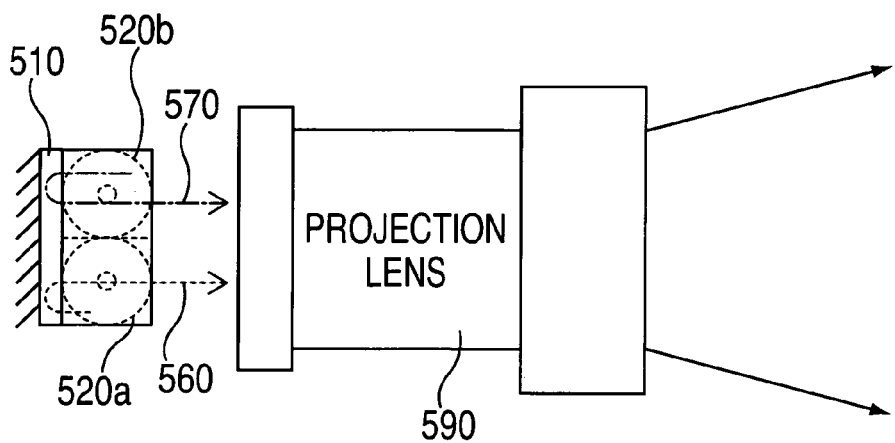
Figure 5A:
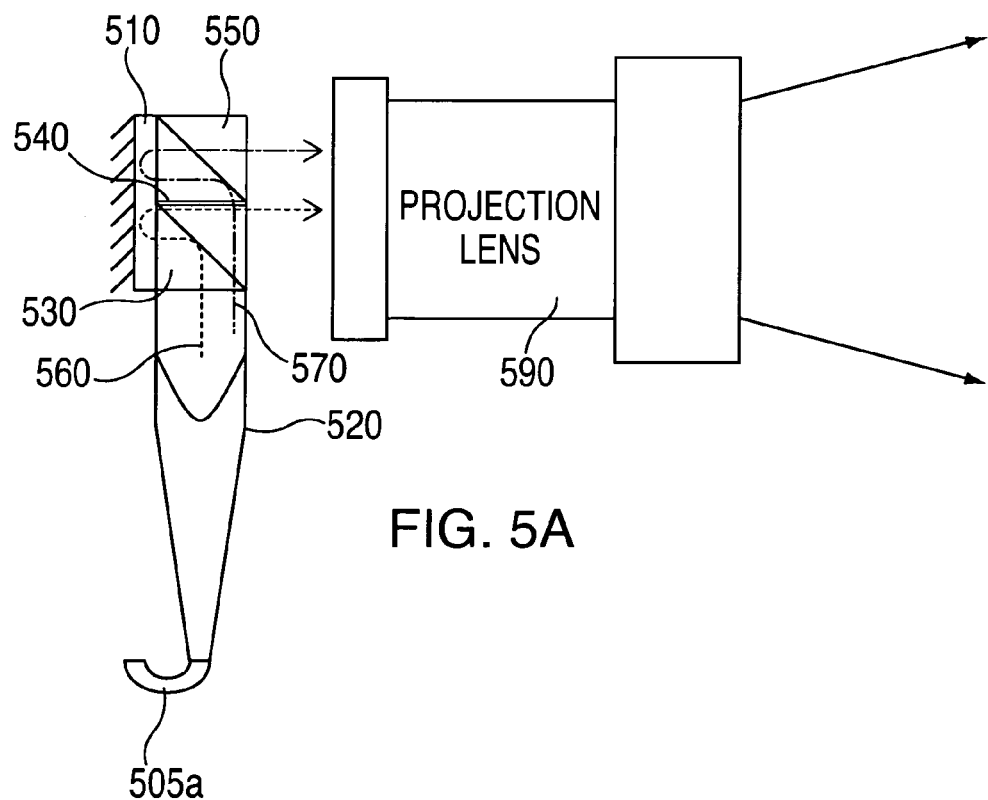
Figure 6:
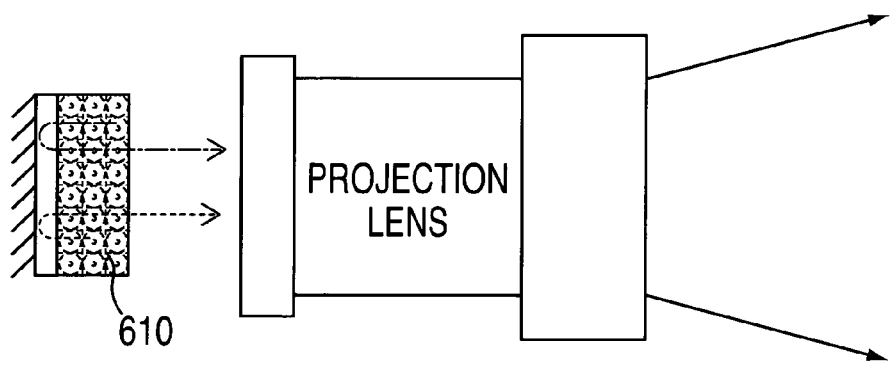
Figure 6A:
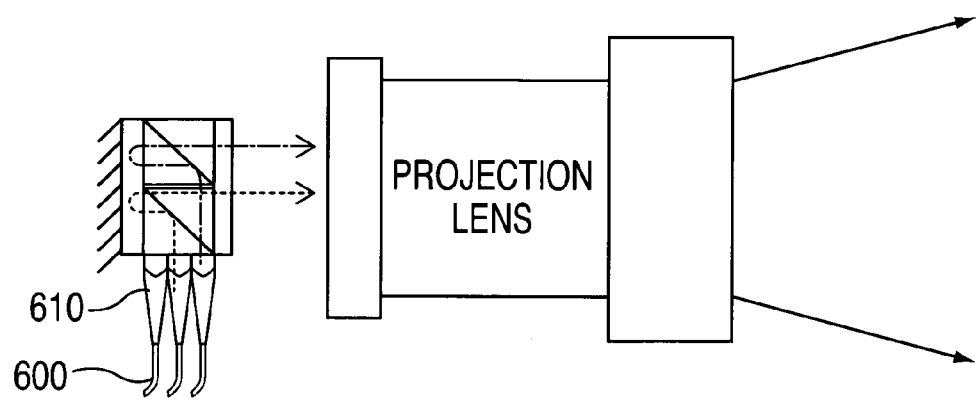
Figure 7:
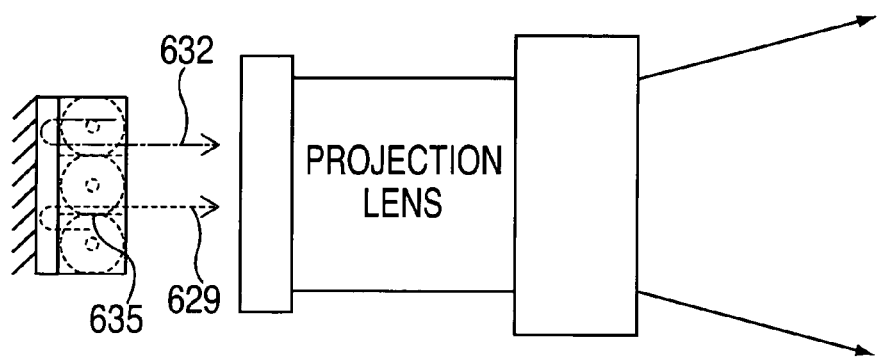
Figure 7A:
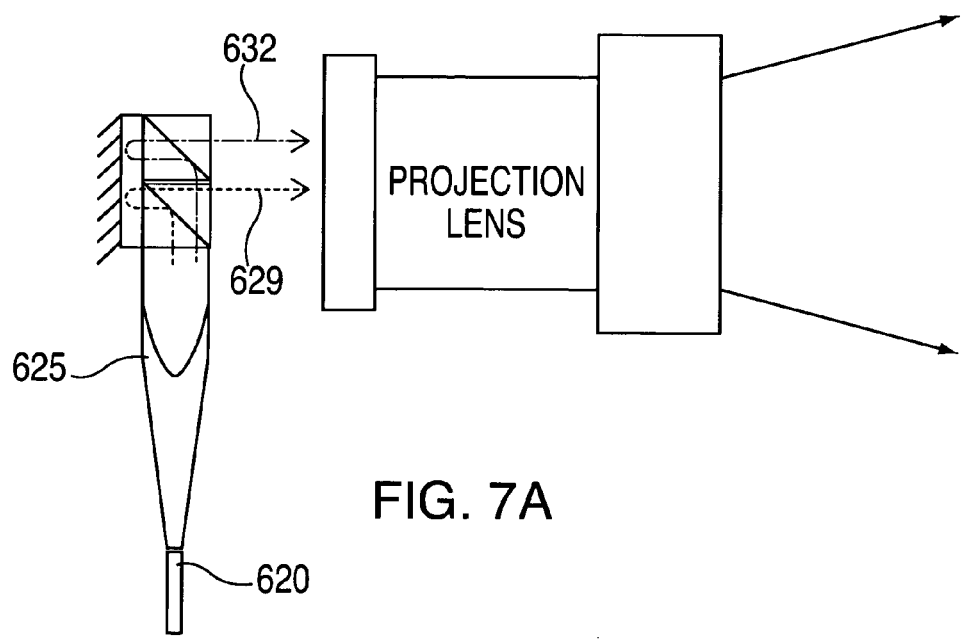

FIGS. 5 and 5A details an illumination approach utilizing a single 1:1 aspect ratio reflective imager FIGS. 6 and 6A details an illumination approach utilizing a single 4:3 aspect ratio reflective imager FIGS. 7 and 7A details an illumination approach utilizing three transmissive imagers.

FIGS. 8 and 8A details a scrolling illumination approach utilizing three reflective imagers.

Figure 9:
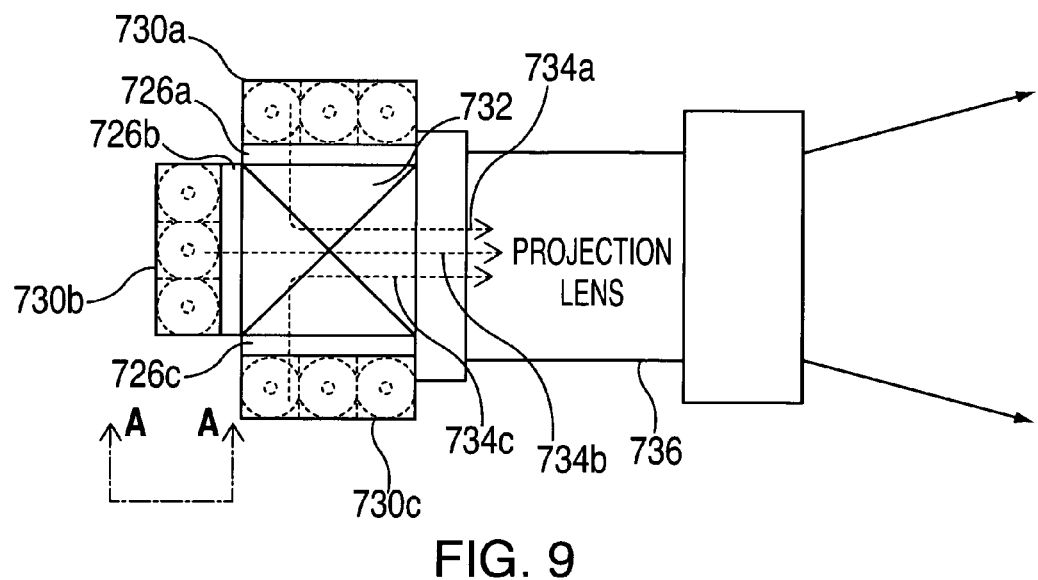
Figure 9A:
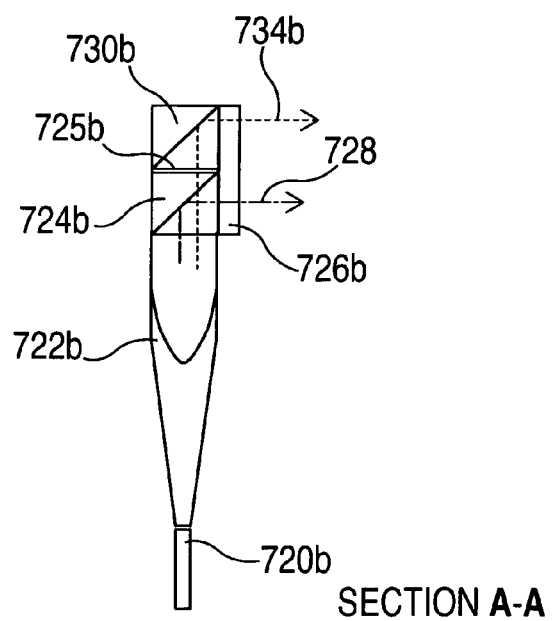

FIGS. 9 and 9A details an illumination approach utilizing three 4:3 aspect ratio transmissive imagers.

Figure 10:
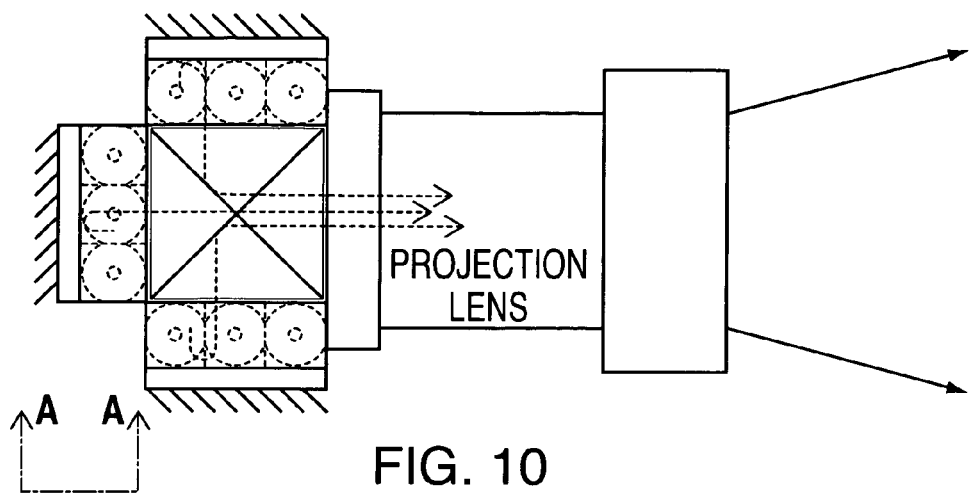
Figure 10A:
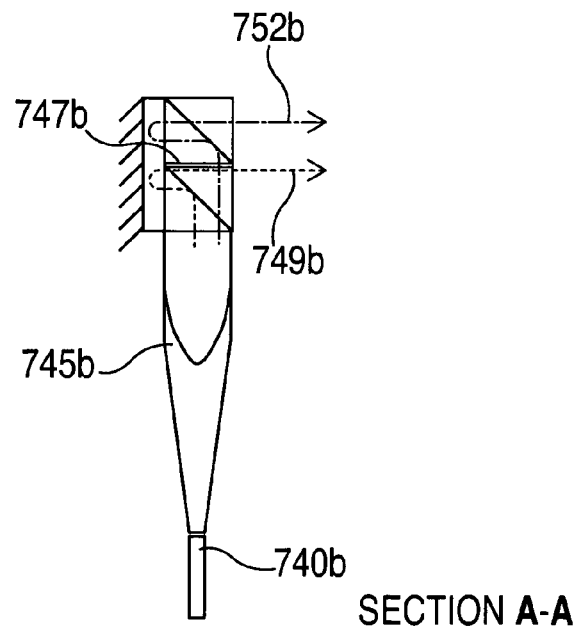

FIGS. 10 and 10A details an illumination approach utilizing three 4:3 aspect ratio reflective imagers.

Figure 11:
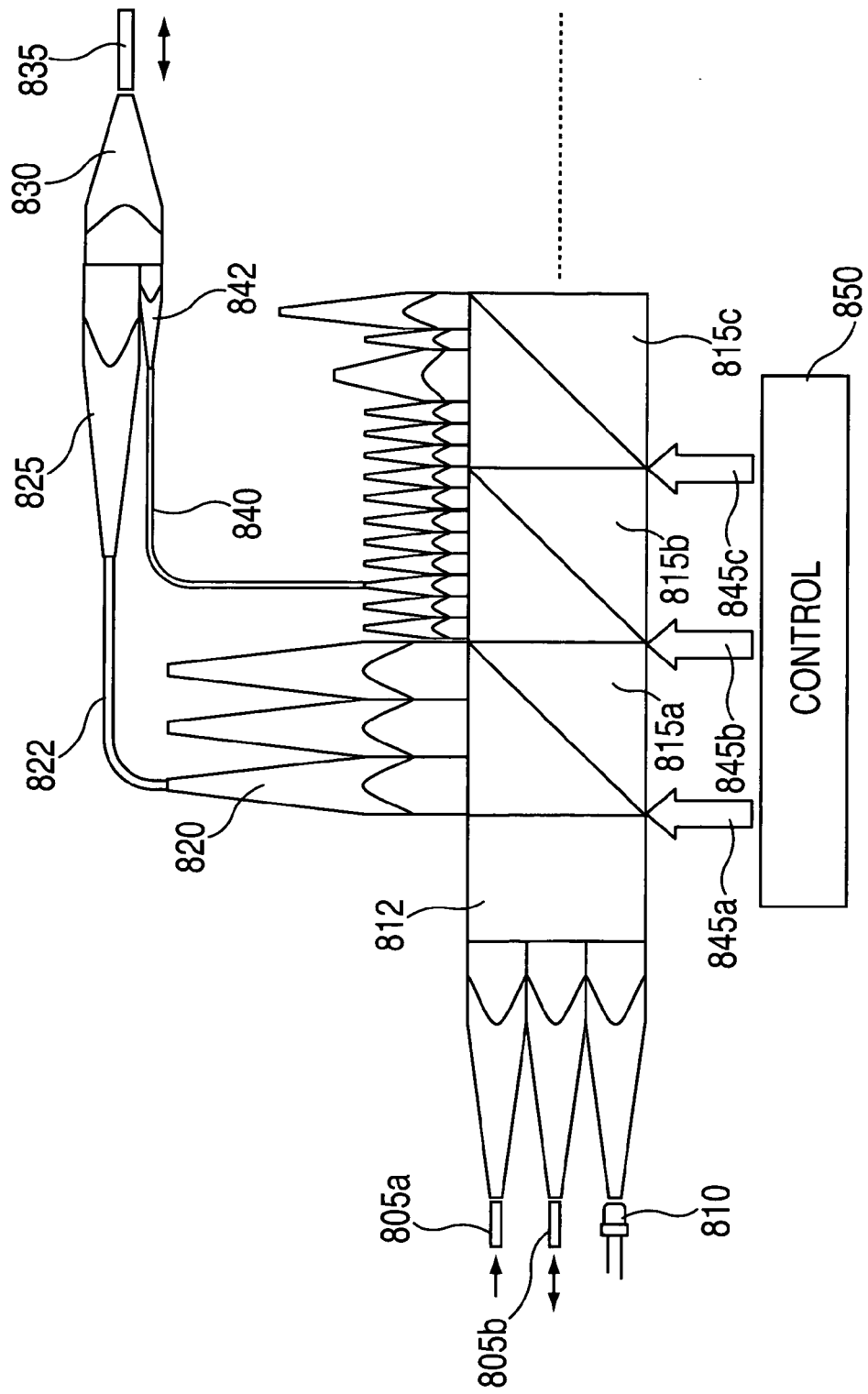

FIG. 11 illustrates an electro-optical switching system for communications-grade fiber optics based on an approach similar to the illumination-grade fiber optic approach shown in FIG. 2.

Figure 12:
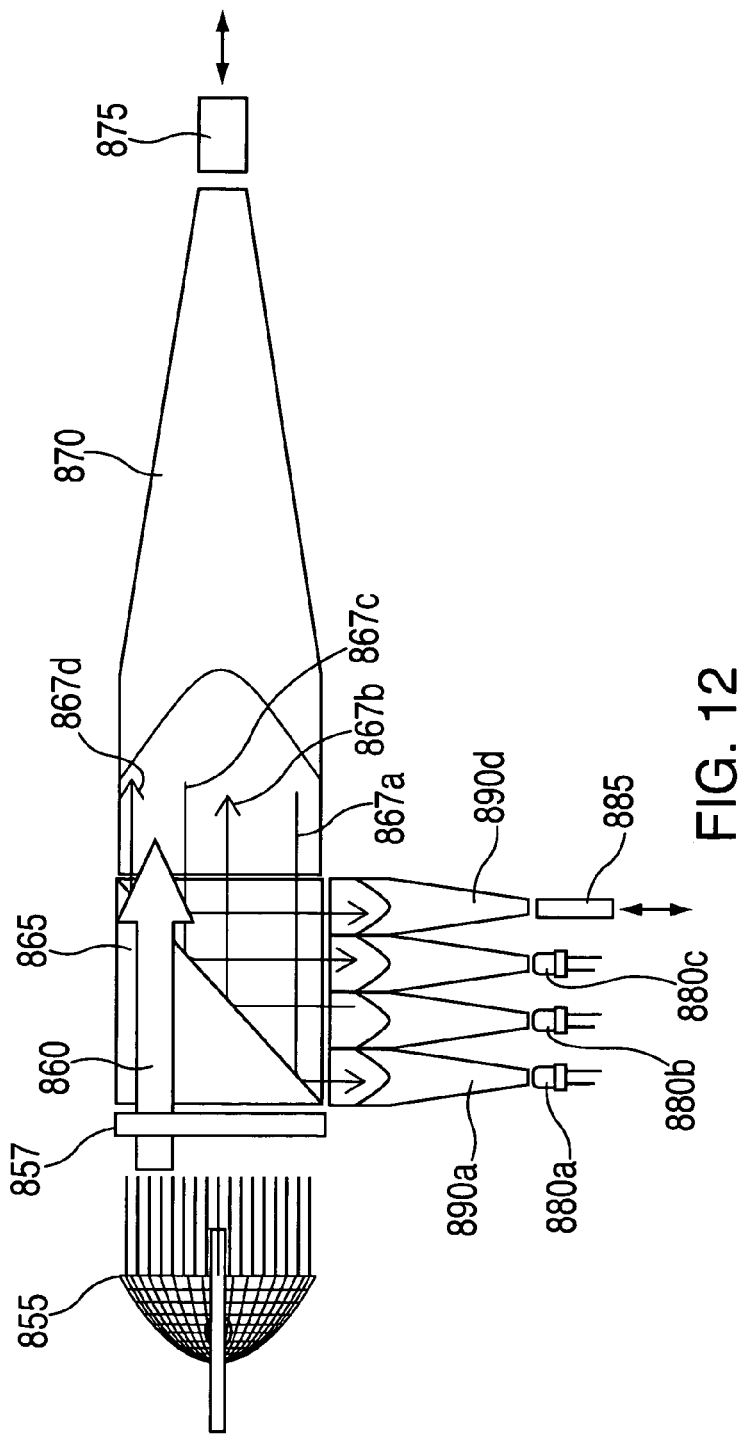

FIG. 12 illustrates a system that multiplexes illumination and communication over the same optical fiber.

Figure 13:
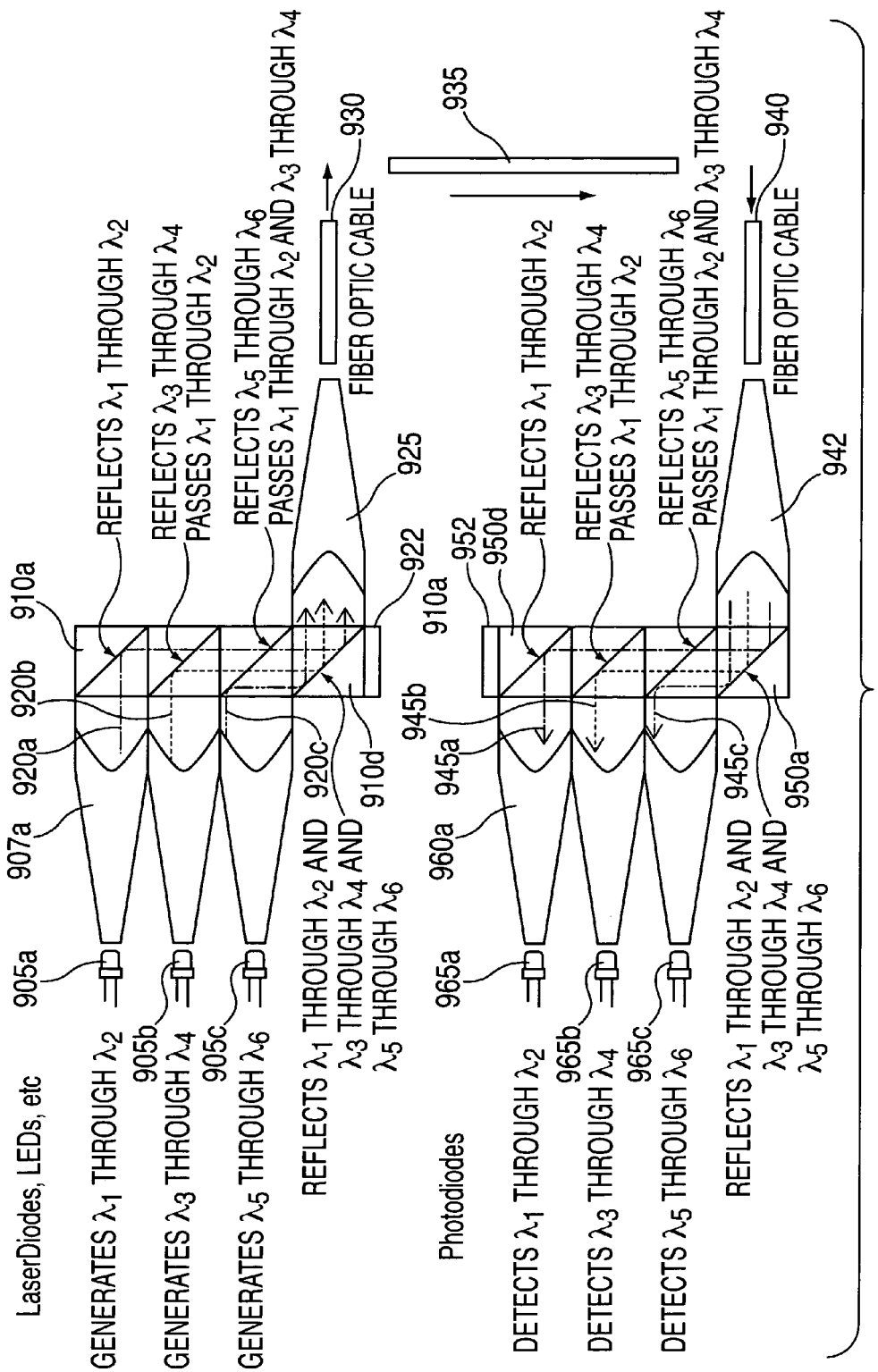

FIG. 13 details a multiplexer and a demultiplexer for communications-grade optical fibers.

DETAILED DESCRIPTION OF THE INVENTION

Mode(s) for Carrying Out the Invention

Referring first to FIG. 1, a tiled projected image 100 is composed of individual display tiles 101A . . . 101N. A preferred embodiment of my invention has a three-row by four-column array of display tiles as shown in FIG. 1. Further embodiments contemplated can have different tile configurations including non-rectangular display tiles, such as hexagons, and tile configurations where the composite projected display is non-rectangular, such as a triangle, or non-planar, such as a hemisphere.

Referring to FIG. 2, an array of fibers 120*a, b, c* provide a source of white light into an array of non-imaging morphing collimating elements (NIMCOLEs) 122*a, b, c* respectively. Each NIMCOLE interfaces with a round fiber, and then collimates the received energy from the fiber with a conical tapered feature, and then morphs the output from a round cross section to one of polygonal cross section (in this example, square). The polygonal cross section remains constant for a distance, providing several benefits. First, it adds a degree of homogenization, as is known in the art. Second, it enables elements to be arranged in close-packed arrays, with the planar surfaces acting as self-aligning features. Third, additional homogenization can be enabled when adjacent planar faces are brought into optical contact, thereby mixing between NIMCOLEs. Conversely, if the homogenization is not desirable, the planar faces can be optically isolated (e.g. by use of an adhesive with a lower refractive index than the NIMCOLEs).

Referring back to FIG. 2, the output of NIMCOLEs 122*a, b, c* can be made more uniform by an additional (optional) homogenizer element 124, which can be one of the many types deployed in projectors and known in the art, such as the LightTunnel™ manufactured by Unaxis (formerly Balzers), and the like. The path length of homogenizer 124 is not necessarily to scale, depends upon the approach selected, and can be identified using any suitable ray-trace program such as ASAP™ from Breault Research or Light Tools® from Optical Research Associates. Other suitable classes of homogenizer are the fly's eye light integrator lens arrays and arrays of crossed cylindrical lenses.

Following the optional homogenizer 124 is a series of cube beamsplitters, 140*a, b, c*, one each for red, green, blue, of the form called "dielectric cube beamsplitters" manufactured, for example, by Melles Griot. Note that although solid cube beamsplitters are the preferred embodiment, hollow cube beamsplitters can be constructed with prismatic films as in Whitehead in U.S. Pat. No. 4,260,220 or multilayer polymeric mirror technology from 3M. Of the white light entering beamsplitter 140*a*, the red component, 126*a* would be directed upwards only through face 147*a*. The remaining light (i.e. green+blue) enters beamsplitter 140*b*, of which the green component 126*b* is directed upwards only through face 147*b*. Finally, the remaining blue light 126*c* is directed upwards in the last beamsplitter 140*c*, exiting only through face 147*c*. In order to ensure that each color only exits through its respective face, optical interfaces of lesser refractive index than prisms 140*a, b, c* must be applied at boundaries 149*a, b, c, d*. The lower index, much like the cladding on an optical fiber, will ensure that the rays directed upwards do not cross the boundaries by virtue of total internal reflection, herein referred to as TIR. The lower index at the boundary would, for example, be an optically transparent silicone gel, such as those manufactured by Nye Optical. Air is also suitable due to its low index, but there will be higher fresnel reflection losses for light travelling normal to faces 149*a, b, c*. Silicone based products have indices lower than most glasses and optical-grade polymers, and can be manufactured as optically clear. The actual index can be calculated as follows, to rough order:

$$n_{low} < n_{cube} * \sin(90-\theta)$$

where:
$n_{low}$ is the low index material
$n_{cube}$ is the index of the cube
$\theta$ is the worse-case divergence (within the cube) relative to the surface normal to faces 147*a, b, c*.

As an example, a cube made from BK7 (n=1.52 @ 550 nm), with $\theta$=6 degrees worse-case (within the cube) normal to faces 147*a, b, c*, would require $n_{low}$<1.51. It is important to note that dispersion and temperature effects must be accounted for, and so $n_{low}$ would be slightly less than 1.51. Additionally, the boundary material should be optically clear, otherwise, losses due to bulk transmittance and scatter (rays normal to face 149*a*) and evanescence (rays that TIR from face 149*a*) will be realized.

Referring back to FIG. 2, a beam dump 150 can be positioned at the end of the beamsplitter 140*c* to absorb any light that wasn't extracted previously. For example, the yellow/orange band of light prevalent in metal halide and high pressure mercury arc lamps that leads to red desaturation, roughly the band between 575 nm to 600 nm, can be dumped into beam dump 150, by configuring beamsplitters 140*a, b, c* to pass that band of radiation.

The light directed upwards, 126*a, b, c*, is made incident upon an array of non-imaging morphing concentrating elements (NIMCONEs), for example the group comprising 130*a, b, c*. These elements are used to couple the maximum amount of energy into fibers 132*a, b, c*, respectively. The exact shape of the NIMCOLEs and NIMCONEs can be readily ascertained using ASAP™ or Light Tools®. The planar features of each NIMCONE provide the same type of benefits specified previously for the NIMCOLEs.

As an alternative to dielectric coatings for the hypotenuse of beamsplitting cubes 140*a, b, c*, electro-optical elements can be used, herein referred to as EOEs. For example, Digilens manufactures Electronically Switchable Bragg Gratings (ESBG) made using Polymer Dispersed Liquid Crystals (PDLCs). Multiple layers can be stacked, with each layer operating on a different wavelength band. When a given layer is not selected, it is transparent. A given layer is selected by applying a voltage across the PDLC, as shown in FIG. 2 being generated by control electronics 145, and routed to the elements by electrical busses 142*a, b, c*. Should the optical bandwidth of the EOE be insufficient (i.e. limited reflection bandwidth), then additional beamsplitting cube stages can be employed.

Should the EOE be polarization sensitive, such as the Color Switch™ from ColorLink shown in FIG. 3, then the optional homogenizer element 168 would be preceded by a polarization converter, as provided by polarizing beamsplitting elements 163*a, b* and retarder foil 164. An additional retarder foil 167 can be used to convert the entire beam into p-polarization. Note however, that the number of NIMCOLEs would need to be halved in line with the constraints of etendue should energy efficiency be of any concern; otherwise, a less expensive absorptive polarizer can be used. EOEs 189*a, b, c* are manufactured, again utilizing the electro-optical effect of liquid crystals, this time to rotate select wavelength bands of light from p-polarization to s-polarization. For example, element 189*a*, receiving white light, would first rotate the red band from p- to s-, so that the red component within 168*a* can be reflected from polarizing beamsplitter 180*a* up through face 187*a* towards the NIMCONE group comprising 170*a* and its respective fiber 172*a*. Similarly, EOEs 189*b* and 189*c* are used to extract green and blue bands, respectively. In a frame sequential system, control element 185 then switches the voltages on the EOEs 189*a, b, c* via electrical busses 182*a, b, c* respectively, so that, for example, the light 169*a, b, c* is R-G-B for frame n, G-B-R for frame n+1, B-R-G for frame n+2, then back to R-G-B for frame n+3.

As discussed earlier the need for flicker-free performance will dictate that switching times (rise time+fall time) for the EOEs are on the order of 1 msec or less.

If the wavelength bandwidth of an individual EOE is insufficient to control an entire color band, be it red, green, or blue, additional EOE stages can be added. For example, if an EOE stage can only switch 30 nm-wide-bands at a time, then assuming the system is not etendue-limited and/or severely cost constrained, green can encompass three beamsplitters—505 nm–535 nm, 535 nm–565 nm and 565 nm–595 nm. In fact, this type of approach can then be used to favor color saturation, brightness, or both, by selecting one, two, or all three green EOEs.

FIG. 4 depicts a system-level view of tiles 101A . . . 101N receiving a portion of a complete image as projected from associated display projectors 400A 400N. Each display projector 400 comprises a projection lens assembly 401 and an image formation unit 410. In one embodiment of my invention, the image formation unit 410 comprises three transmissive polysilicon (Poly-Si) liquid crystal (LC) devices, consisting of a Blue LC device 411, a Green LC device 412, and a Red LC device 413, as well as combining optics 414. Such high temperature Poly-Si (HTPS) devices are available, for example, from Sony and Epson. In another embodiment of my invention, the imaging device comprises three reflective micro electromechanical system (MEMS) based image device 410 instead of LC based devices as described above. Other contemplated embodiments of my inventions use other transmissive and reflective image formation units 410, such as reflective liquid crystal on silicon (LCOS) to create the projected image. The coupling of the light from the fiber to the imagers are shown in FIGS. 5–10.

Referring back to FIG. 4, light is generated by light engines 250 and 275 and is routed by fiber optic cables 265 and 290, respectively to a light separation unit 300, details of which were shown in FIG. 2 and FIG. 3. Briefly, the light is first homogenized by element 305, and then separated the light into primary color components such as blue, green, and red. The primary color components are routed from the light separation unit 300 by a second set of fiber optic cables 350 to display projectors 400A . . . 400N, where the display image is formed and projected onto display tiles 101A . . . 100N. Wavelengths that could lead to desaturation effects can be passed by beamsplitters 301, 302 and 303 and routed to beam dump 304. A beam dump can be comprised of a wide variety of materials.

Other embodiments span from one light engine to a number limited by cost and/or performance requirements. Performance requirements can be related to one or more of the following: system availability in the event of one or more light engine failures, brightness limitations as dictated by etendue, spectral and/or restrike qualities that can only be met via a hybrid approach encompassing multiple types of light sources, etc. Sources 250 and 275 depict the desire to avoid packing fraction losses through the illustration of NIMCONEs 260 and 285 respectively. Note that while FIG. 4 depicts traditional three-imager projectors, the same system-level approach can be applied to frame-sequential systems, with details to follow.

It is important to note that due to losses in fibers 350, it is also necessary to ensure that the optical path lengths and equivalent bends in the fibers 350 remain relatively constant within a given projector 400 and between projectors 400A through 400N. Alternatively, optical attenuators can be used to re-balance the system. Such attenuators can be as simple as in-line neutral density filters, or can be as sophisticated as electro-optical (EO) shutters regulating light via pulse-width-modulation (PWM), either as part of light separation unit 300, external to it, or some combination of both. This same PWM technique can also act as a dimmer—a feature that is not achievable through standard power-reduction techniques for most high intensity discharge (HID) lamps due to effects on lamp life.

Another important aspect of this invention is in maintaining a known relationship between display projectors 400A . . . 400N. This can be accomplished by first affixing the relationship between adjacent projectors using rod elements whose lengths are well characterized over temperature, and then aligning the system using techniques suggested by Johnson et al, U.S. Pat. No. 6,219,099, and the like. For example, a bar member having left and right hand sections of positive and negative coefficients of thermal expansion is taught by Krim in U.S. Pat. No. 4,282,688. The bar is tuned so that expansion of one section is offset by contraction of the other section in a varying temperature environment, such that the expansion coefficient is on the order of $\pm 0.01 \times 10^{-6}$ in/in-° F. Note that the JVC 2048×1536 imager has a 4:3 aspect ratio and is 1.3" in diagonal. That translates to a pixel pitch of $5.08 \times 10^{-4}$ in. If the connecting rods, for example, are 10 inches long (allowing sufficient width for the projection lens), and the worse-case temperature gradient between one rod and another is 30° F. (one rod is at room temperature of 77° F., another is at 107° F.), the net movement is:

$$(0.01 \times 10^{-6} \, in/in\text{-}°F.) * (10 \, inches) * (30°F.) = 3 \times 10^{-6} \, inch$$

which is two orders of magnitude smaller than the pixel pitch—therefore, no movement would be perceived. With that amount of margin, a tiled array could withstand the full military temperature range of −55° C. to +85° C. (−67° F. to +185° F.).

Alternatively, Ruble, et al, U.S. Pat. No. 3,753,254 teaches the use of thermistors for measuring the temperature along the rod for determining relative movement since an initial calibration, and then applying a compensation signal. In a tiled projection system, these compensation signals can then be applied to the algorithms taught by Johnson et al, in order to adjust the image of each projector on a periodic basis to maintain tile registration.

Note that further expansion compensation can be considered by use of heating elements to maintain a constant rod temperature, thereby providing a hybrid between that taught by Krim and Ruble et al. More accurate techniques can be employed, such as that taught by Berg, U.S. Pat. No. 5,121,987, whereby an optical dilatometer system is employed, from which a compensating signal can be developed. A piezoelectric-based mechanical actuator, of one or more stages, can also be used in conjunction with displacement sensors to provide compensation, by adjusting the position of the imager relative to those in neighboring projectors. It is also interesting to note that by locating the high power dissipating components (e.g. arc lamp) remotely, the temperature gradients in and around the individual projector units are less severe than having a lamp within each projector. This then induces less expansion in the connecting rods, thereby simplifying the control system to maintain proper image registration between tiles.

The temperature compensated rods would preferably be connected to mechanical platforms within each projection assembly. The platform would be used to accurately align the imager subassembly and projection lens to each other, and provide fastening points for the rods to adjacent projection assemblies. Each platform would "float" within its protective housing. The rods would penetrate the housings through environmentally sealed ports that prevent contamination of the optical assembly. Such ports can be sealed using flexible bellows elements as is known in the art. The rods can be arranged in a simple 2D-lattice arrangement, or in a 3D mesh, either for additional stability, or to project onto curved surfaces. The housings would be hard-mounted to each other via angle irons, for example, and the overall assembly suspended from a wall or ceiling.

Alternatively, the platform assemblies and connecting rods can be contained within a single housing for use in such diverse applications as home theater, command & control centers, and cockpit displays. A single housing, with a recirculating fan, can also enable better temperature uniformity across and between elements, again reducing any thermally induced misregistrations between tiles.

An efficient light distribution approach for coupling light in accordance with my present invention from fibers 505 to a 1:1 aspect ratio reflective imager 510 and projected by projection lens 590 is detailed in FIGS. 5 and 5A. Imager 510 in this embodiment is, for example, a LCOS device; thereby operating on polarized light. Light from fibers 505a is first collimated using NIMCOLEs 520, and then converted into a polarized beam 560 and 570 via polarized beamsplitters 530 and 550, separated by retarder foil 540. Beam 560 illustrates the s-polarized component exiting NIMCOLE 520, which reflects off of polarizing beamsplitter 530, and then is modulated by imager 510. The light to be projected comes off the imager as p-polarized, enabling it to pass through beamsplitter 530, exiting to the projection lens 590. Beam 570 illustrates the p-polarized component exiting NIMCOLE 520, which passes through polarizing beamsplitter 530, is converted to s-polarization by retarder foil 540, and then reflects off of polarizing beamsplitter 550 to be modulated by imager 510. The light to be projected comes off the imager as p-polarized, enabling it to pass through beamsplitter 550, exiting to the projection lens 590. Note that an additional retarder foil may be necessary between the imager and illumination optics (not shown), depending upon the polarizing properties of the imager. Also, a phase correcting plate as taught by Dove et al, U.S. Pat. No. 6,082, 861, can be inserted between the imager and illumination optics (not shown) to enhance contrast.

With a 1:1 aspect ratio imager, unpolarized light from fibers 505 will be collimated by NIMCOLEs 520, but can only illuminate one-half of the imager due to etendue constraints. As a result, two NIMCOLEs, each with square exit ports can efficiently fill the imager as shown in Top- and Side-Views in FIG. 5.

FIGS. 6 and 6A demonstrate one optical solution for a 4:3 aspect ratio imager. In this case a 3×8 array is one solution that allows all NIMCOLES 610 attached to fibers 600 to have square exit ports and efficiently fill the imager, as shown in the Top-and-Side-Views in FIGS. 6 and 6A. Note that the HDTV 16:9 aspect ratio (or any other for that matter) can be accommodated in a similar fashion.

For any of the inventive configurations, the effects of birefringence must be considered. Prisms, non-imaging optical elements, as well as imaging elements (i.e. lenses) and the like, especially if molded, can exhibit considerable birefringence, mostly due to internal stresses. In some cases annealing can be employed to relax the stresses, in other cases, special materials must be utilized.

Referring now to FIGS. 7 and 7A, there is shown another solution in accordance with my invention illuminating a 4:3 aspect ratio imager (or a 16:9 aspect ratio imager, or as a general case any non 1:1 aspect ratio imager). In this case, three square exit face NIMCOLEs 625, which are attached to fibers 620 and provide the beams 629 and 632, would slightly overfill the imager, leading to an efficiency loss. Should this loss be unacceptable, the NIMCOLEs can be "shaved" on each side, avoiding overfilling the imager. The downside of this approach is that the collimation in one-axis will be less than the other since the tapered cone is not as long in one axis. However, this may be a more equitable trade than the 3×8 array shown in FIG. 6. Note that overfilling the imager may be necessary, to at least a small degree, in order to ensure full illumination of the imager over the mechanical tolerances of the individual components, assembly processes, over the desired environmental conditions.

If the imager in FIGS. 7 and 7A switches fast enough, it enables the configuration of a frame sequential (FS) tiled projector system. The Digital Micromirror Device (DMD) from Texas Instruments, and LCOS solutions from Philips and Displaytech are examples of such imagers. The FS approach, due to its simplicity, forms a preferred embodiment of this invention, as discussed below.

FIGS. 8 and 8A depicts another useful feature of an imager illuminated by three NIMCOLEs—namely, a scrolling illumination system, akin to that referenced earlier, Bradley, U.S. Pat. No. 5,845,981. In Bradley, prisms are mechanically rotated. This mechanical motion is eliminated by using the approach shown in FIG. 8, whereby fibers 640a, b, c would receive red, green, and blue light, respectively. Each color would be collimated by a corresponding NIMCOLE, 645a, b, c. The optical path for each of these elements maintains isolation via a low refractive index between adjacent columnar prism pair elements 668a, b, c, thereby preventing the mixing of colors. For example, element 668a includes two beamsplitting prisms—an upper prism through which light beam 675 passes, and lower prism through which beam 670 passes, with upper and lower prisms separated by a retarder foil. Likewise, elements 668b and 668c each include two prisms, making a total of six prisms.

In a frame sequential system, an electromechanical color sequencer (e.g. color wheel, scrolling prism, or the like) or preferably an electro-optical color sequencer (as shown in FIGS. 2 and 3, for example), switches the light into fibers 640a, b, c each frame, such that prism pairs 668a, b, c supply, respectively, R-G-B for frame n, G-B-R for frame n+1, B-R-G for frame n+2, then back to R-G-B for frame n+3.

Also note that in FIGS. 8 and 8A, the NIMCOLES have been rotated 90 degrees via prism pair 655 and 660 to allow for a more streamlined packaging approach. Optional spacer elements 665 (one per color, and again, optically isolated from each other) are shown if additional mechanical clearances are required.

With a reasonable degree of collimation and a thin cover glass to the imager, the border pixels between adjacent scrolling colors can avoid being mixed. Alternate methods to prevent mixing between adjacently scrolled sections of the imager can be employed, such as masking the imager cover glass and/or separating the cover glass into three optically isolated sections. Alternatively, adhesively bonded prism pairs 668a, b, c can themselves act as the cover glass. Note also that the retarder foil between prism pairs can be a laminated-film, a thin-film coating, or some combination of the two.

In FIGS. 9 and 9A, an illumination arrangement is shown for a three transmissive imager system, much like that referenced in FIG. 4, including NIMCOLE 722b connected to fiber 720b, prism pair elements 724b and 730b, retarder foil 725b, transmissive polarized imagers 726 a, b, and c, and the resultant polarized beams 728 and 734 a, b, and c. The three colors are combined using, for example, a Color Cube™ 732 as sold by Unaxis (formerly Balzers). The light that exits is then projected by projection lens 736 onto the viewing surface.

FIGS. 10 and 10A demonstrate a reflective imager version of FIGS. 9 and 9A, including NIMCOLE 725b connected to fiber 740b and the resultant polarized beams 749b and 752b. Note that for non-polarized imagers, such as the Texas Instruments DMD, the retarder foil 747b and corresponding beamsplitting prism elements are not required. For configurations of one, two, or three DMDs, arrays of NIMCOLEs, of the same size as the active area of the DMD, can replace the traditional light source and collimation optics prescribed by Texas Instruments.

While there are merits to the all the configurations shown in FIGS. 4 through 10, a frame-sequential (FS) tiled projection system appears to be the simplest approach offering the best tile-to-tile uniformity. A remote source with centralized color sequencing offers homogenized brightness and spectral distribution from tile-to-tile. The use of plastic optical fiber in combination with non-imaging morphing collimators and concentrators provide cost and efficiency gains critical to deeper market penetration than existing systems. Finally, the thermally compensated connecting rods deal with tile-to-tile movement after initial calibration, thereby obviating the need to recalibrate using cameras as taught in prior art. Advantageously, by applying thermal compensation algorithms such as those known in the art, this system can avoid using gradient filters by providing sharp cutoffs between tiles, since the rods will ensure alignment. The system will also avoid loss of gray shades since the FS approach with centralized color switching ensures color and brightness uniformity between tiles.

The centralized color sequencing would be provided by an electro-optical system such as that shown in FIG. 2 or FIG. 3. The choice between FS imagers (e.g. Texas Instruments' DMD vs. Philips' LCOS, referenced earlier), much like the choice between color sequencers (e.g. Digilens' ESBG vs. ColorLink's Color Switch™), would be based upon system cost and other factors pertinent to the application. Of course, if the FS imager were based upon polarization, the illumination system would be based upon the configurations shown in FIGS. 5–8. If the FS imager were non-polarized, then as discussed earlier, the output of a close-packed array of NIMCOLEs would be cast upon the imager (no need for polarization conversion optics).

Lacking any other requirements, a single light source would be preferred over multiple sources, and one such source is of high-pressure mercury (HPM) type (e.g. manufactured by Philips). If system availability (or other reasons discussed previously) were of importance, a multi-lamp combiner as shown in FIG. 4 would be utilized. Interestingly, ceramic metal halide lamps offer very high spectral efficiency for imaging systems, assuming their less desirable features (longer arc than HPM and lack of hot restrike) can be overcome. For example, an N×M tiled-system has the equivalent imager area of N×M times the area of a single imager. From an etendue standpoint then, longer arc gap lamps can then be used, assuming the system brightness requirements aren't overly ambitious, and the viewing screen has a reasonable amount of gain and efficiency.

In FIG. 11, the color separation system in FIG. 2 and FIG. 3 is applied to optical communication systems. For example, three sources are merged—a unidirectional signal from fiber 805a, a bi-directional signal from fiber 805b, and either a photodiode (or other receiver) or a laser diode (or other transmitter) from element 810. To do this, the three sources are collimated by NIMCOLES so that they all have the same numerical aperture. The signals are then homogenized by element 812 and distributed via prisms 815a, b, c to NIM-CONES. For example, NIMCONE 820 feeds another fiber 822 which is then mixed with the contents of fiber 840, and then sent along a common fiber 835. These systems can be statically or dynamically switched as discussed earlier, using EOEs, by control element 850 and electrical busses 845 a, b, c, as described above with respect to FIGS. 2 and 3. Note that the coupling array comprising 825, 842, and 830 is a generic function that can be applied to a variety of applications.

As another generic example, illumination and communication can coexist over the same fiber, so long as there's some difference between transit modes. For example, in FIG. 12, a visible light illumination source, 855 is combined with near-infrared communication signals (e.g. source 880b) by use of beam combiner 865. The hypotenuse of combiner 865 is configured in this example to pass visible light 865 and reflect near infrared light 867a, b, c, d. As shown, the signals can coexist on fiber 875 by using a NIMCONE 870 as an efficiently coupler between round fiber 875 and square beamsplitter 865. A hot mirror 857, similar to the CALFLEX™ brand from Unaxis, is employed to ensure that visible light 860 does not degrade the signal-to-noise ratio (S/N) of infrared signals 867a, b, c, d. Of course the rejection of the filter must be carefully considered, and multiple filters may be required to achieve the appropriate attenuation of nuisance infrared light from the visible source. Also note that the fiber 875 must be able to carry both visible and infrared energy. From a practical standpoint, POF could be employed if the infrared communication band was below around 850 nm, where plastic still maintains reasonable transmittance. Interestingly, filters used in military night vision compatible displays (such as those sold by Wamco and others) are well suited to complement a standard hot mirror, often providing optical densities of four or more beyond 650 nm.

FIG. 13 depicts an optical multiplexer with element 925 feeding a fiber optical cable 930, 935, 940, then followed by an optical demultiplexer receiving light first through element 942. Laser diodes 905a, b, c each operates on a separate part of the spectrum. Beamsplitters 910 are used to efficiently combine the beams, feeding a NIMCONE 925 that drives fiber 930, 935, 940. An optional beam dump, 922 can be used to strip way optical energy that would degrade the S/N of the system. Optical energy returning on fiber cable 940 is then demultiplexed by beamsplitters 950, and sent to the appropriate photodiode detector by NIMCONEs 960. Again, an optional beam dump 952 can be employed to enhance S/N.

Finally, FIG. 14 depicts a crosspoint switch employing X-cube prisms, which can be complemented by EOEs controlled by electronic system 982. Source 970 is routed through the X-cube prism elements out to fiber 978. A portion of the energy is routed back to receiver 996, for example, to monitor the source. Many different configurations are possible, although, as is known in the art, it is not desirable to switch the energy from one source to cause damage to another source, but this is true of most any crosspoint switch, be it optical or electrical.

Alternate Embodiments

Alternate embodiments may be devised without departing from the spirit or the scope of the invention. For example, while the proposed alignment rod approach relates to tiled projection displays, one can consider the technique applicable to any array of apertures. The use of visible and infrared light described herein can also apply to electromagnetic energy in general. The term optical fiber, fiber optic, optical conduit, and the like can be generically described as a conduit. Finally, many of the embodiments described herein relate equally well to illumination systems, communication systems, and combinations of both.

What is claimed is:

1. A beamsplitter system comprising in sequence:
   a plurality of illumination sources (120);
   a plurality of close-packed non-imaging morphing collimating optical elements (122) adapted to receive a light input from said illumination sources;
   a plurality of beam splitting prisms (140) configured to split an incoming light beam;
   a plurality of non-imaging concentrating elements (130) adapted to receive split light beams from said beam splitting prisms; and
   a beam dump (150) adapted to receive light that is not received by said non-imaging concentrating elements.

2. The beamsplitter of claim 1 wherein said beam splitting prisms split said incoming beams as a function of a characteristic of said incoming beams selected from the group consisting of wavelength, polarization, and time.

3. The beamsplitter system of claim 1 further comprising a plurality of optical conduits wherein each of said optical conduits is connected to a light output of a corresponding one of said non-imaging concentrating elements.

4. The beamsplitter system of claim 1 further comprising a plurality of optical detectors wherein each of said optical detectors is connected to a light output of a corresponding one of said non-imaging concentrating elements.

5. The beamsplitter system of claim 1 further comprising a plurality of optical homogenizers (168), wherein each of said homogenizers is optically situated between one of said non-imaging collimating optical elements and a corresponding one of said beamsplitting prisms (180).

6. The beamsplitter system of claim 1 further comprising a plurality of optical polarization separation elements, wherein each of said polarization separation elements is optically situated between one of said non-imaging collimating optical elements and a corresponding one of said beamsplitting prisms (180).

7. The beamsplitter system of claim 1 wherein the proportion of energy directed by one or more of said beamsplitting prisms is electrically controlled to perform a function selected from the group consisting of: optical dimming, frame sequential color separation, scrolling color separation, and wavelength switching.

8. An illumination system for one or more imaging devices (510,726) comprising:
   a plurality of close-packed non-imaging morphing collimating optical elements (645), each of said optical elements receiving light from a corresponding optical conduit (640), and
   wherein adjacent of said close-packed non-imaging morphing collimating optical elements are configured to operate in a scrolling manner;
   a plurality of prisms (655, 668); and
   wherein each of said prisms is located at a light output of a corresponding optical element.

9. An optical system comprising
   a plurality of illumination sources, each of said sources emitting electromagnetic energy over a different part of the spectrum,
   a plurality of tapered non-imaging collimating elements arranged adjacent each other in a close-packed array and each receiving the electromagnetic energy from a distinct one of said plurality of illumination sources and collimating said energy into a beam along a first axis,
   a plurality of beam splitting prisms arranged in order adjacent each other and adjacent said close-packed array, each for reflecting at least a portion of a distinct one of said beams along a second axis and for transmitting along said second axis beams from prior prisms in said order of prisms, and
   output means for receiving said beams reflected along said second axis.

10. The optical system of claim 9 wherein said output means includes a non-imaging optic element receiving each of said beams reflected along said second axis.

11. The optical system of claim 10 wherein said output means further includes a further beam splitter between the last of said beam splitting prisms and said non-imaging optic element.

12. The optical system of claim 11 wherein said non-imaging optic element is a non-imaging concentrator.

13. The optical system of claim 12 further comprising an output optical fiber connected to said non-imaging concentrator.

14. The optical system of claim 9 wherein each of said illumination sources comprises a semiconductor emitter.

15. The optical system of claim 14 wherein said sources of electromagnetic energy comprise a first semiconductor emitting a first band of electromagnetic energy between wavelengths $\lambda_1$ and $\lambda_2$, a second semiconductor emitting electromagnetic energy between wavelengths $\lambda_3$ and $\lambda_4$, and a third semiconductor emitting electromagnetic energy between wavelengths $\lambda_5$ and $\lambda_6$.

16. The optical system of claim 9 wherein each band comprises a different color.

17. The optical system of claim 9 further comprising a beam dump for receiving electromagnetic energy from said beams not received by said output means.

18. An optical system comprising
   an input optical element for a receiving multiplexed band of electromagnetic energy,
   a plurality of beam splitting prisms arranged in order, the first of said beam splitting prisms receiving said multiplexed band from said input optical element along a first axis and directing said band through successive ones of said beam splitting prisms along a second axis, each of said successive beam splitting prisms reflecting one beam of said multiplexed band along said first axis and transmitting the beams of said multiplexed band not reflected by prior ones of said beam splitting prisms to the next successive one of said beam splitting prisms, and
   a plurality of tapered non-imaging concentrating elements arranged adjacent each other in a close-packed array and each receiving one of said beams from said successive ones of said beam splitting prisms, and a plurality of optical detectors, each for receiving a beam from one of said non-imaging concentrating elements.

19. The optical system of claim 18 wherein said optical detectors are photodiodes.

20. The optical system of claim 18 further comprising a beam dump adjacent the last of said successive ones of said beam splitting prisms for receiving electromagnetic energy not directed by said successive ones of said beam splitting prisms to said tapered non-imaging concentrating elements.

21. The optical system of claim 18 wherein said multiplexed band of electromagnetic energy includes electromagnetic energy between wavelengths $\lambda_1$ and $\lambda_2$, $\lambda_3$ and $\lambda_4$, and $\lambda_5$ and $\lambda_6$.

22. The optical system of claim 18 wherein each band of said multiplexed band of electromagnetic energy comprises a different color.

23. The optical system of claim 18 further comprising an optical fiber connected to said input optical element.

24. An optical system comprising
a plurality of illumination sources carrying information signals,
a plurality of tapered non-imaging optic elements arranged adjacent each other in a close-packed array and each receiving the beam of illumination from a distinct one of said illumination sources and collimating said beams along a first axis,
a visible light illumination source projecting light along a second axis,
a beam combiner receiving said beams from said collimating elements and said light from said light illumination source and projecting said light and said beams along one of said first and said second axes, and
a non-imaging collimator receiving said beams and said light projected by said beam combiner along said one of said first and said second axes.

25. The optical system of claim 24 further comprising an optical fiber connected to said non-imaging collimator.

26. The optical system of claim 25 further comprising a signal detector for receiving from said beam combiner an input signal from said optical fiber.

27. The optical system of claim 24 further comprising means for preventing visible light from degrading the signal-to-noise ratio of said information signals, said means comprising a hot mirror positioned between said visible light source and said combiner.

* * * * *